United States Patent
Osako

(10) Patent No.: US 10,740,046 B2
(45) Date of Patent: Aug. 11, 2020

(54) IMAGE FORMING APPARATUS, NON-TRANSITORY COMPUTER-READABLE RECORDING MEDIUM STORING DISPLAY CONTROL PROGRAM, AND DISPLAY CONTROL METHOD

(71) Applicant: Konica Minolta, Inc., Chiyoda-ku, Tokyo (JP)

(72) Inventor: Satoshi Osako, Hachioji (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 16/376,082

(22) Filed: Apr. 5, 2019

(65) Prior Publication Data

US 2019/0310808 A1 Oct. 10, 2019

(30) Foreign Application Priority Data

Apr. 10, 2018 (JP) ................. 2018-075134

(51) Int. Cl.
*G06F 3/12* (2006.01)
*G06F 3/0481* (2013.01)
*G06F 3/0482* (2013.01)
*G06K 15/02* (2006.01)

(52) U.S. Cl.
CPC .......... *G06F 3/1205* (2013.01); *G06F 3/0482* (2013.01); *G06F 3/04817* (2013.01); *G06F 3/1204* (2013.01); *G06F 3/1268* (2013.01); *G06F 3/1288* (2013.01)

(58) Field of Classification Search
None
See application file for complete search history.

(56) References Cited

U.S. PATENT DOCUMENTS

| | | | |
|---|---|---|---|
| 6,232,968 B1 * | 5/2001 | Alimpich | G06F 9/451 715/744 |
| 9,213,509 B2 * | 12/2015 | Ishikura | B41J 29/38 |
| 2003/0219272 A1 * | 11/2003 | Mishima | G03G 15/5016 399/81 |
| 2007/0236730 A1 * | 10/2007 | Takeuchi | H04N 1/0035 358/1.15 |

(Continued)

FOREIGN PATENT DOCUMENTS

| | | | | |
|---|---|---|---|---|
| JP | 2008-247039 | | 10/2008 | |
| JP | 2008306646 | * | 12/2008 | ............... H04N 1/00 |
| JP | 2010004408 | * | 1/2010 | ............... H04N 1/00 |

*Primary Examiner* — Beniyam Menberu
(74) *Attorney, Agent, or Firm* — BakerHostetler

(57) ABSTRACT

Disclosed are an image forming apparatus, a non-transitory computer-readable recording medium storing a display control program, and a display control method. The image forming apparatus may include a printer engine, a display configured to display screens each relating to a certain function of the apparatus, in different display modes according to operator's use of the function, and a hardware processor. In response to receiving a job which may give print instructions to the printer engine, the hardware processor may analyze the job and determine which of a first display mode and a second display mode is to be used for displaying the screens, on the basis of information contained in the job. The hardware processor may cause the display to display one or more screens showing information about the job, in the determined one of the first display mode and the second display mode.

19 Claims, 13 Drawing Sheets

(56) References Cited

U.S. PATENT DOCUMENTS

| | | | |
|---|---|---|---|
| 2009/0154677 A1* | 6/2009 | Kunii | H04M 1/27475 |
| | | | 379/142.06 |
| 2010/0033744 A1* | 2/2010 | Maeda | H04N 1/00204 |
| | | | 358/1.9 |
| 2010/0296830 A1* | 11/2010 | Kamata | G03G 15/6508 |
| | | | 399/81 |
| 2011/0052242 A1* | 3/2011 | Kamata | G03G 15/5016 |
| | | | 399/82 |
| 2013/0027736 A1* | 1/2013 | Kittaka | G06F 3/04817 |
| | | | 358/1.14 |
| 2014/0068502 A1* | 3/2014 | Tomiyasu | G06F 3/0485 |
| | | | 715/784 |
| 2016/0147386 A1* | 5/2016 | Han | H04N 1/00411 |
| | | | 715/838 |
| 2017/0039011 A1* | 2/2017 | Suzuki | G06F 3/1206 |

* cited by examiner

FIG. 7

| No. | Type | Doc. Name/Destination | Time | Number of Pages | Status/Result | Select Job Type |
|---|---|---|---|---|---|---|
| | | | | | | All |
| 0032 | 187294 | C:¥Users¥187294¥Des | 09:22 | 0 / 1 | Printing | Delete |
| 0033 | 187294 | C:¥Users¥187294¥Des | 09:22 | 0 / 1 | Printing | Give Priority |
| | | | | | | Release Hold Jobs |
| | | | | | | Redial |
| | | | | | | Settings |
| | | | | | | Forward |
| | | | | | | Details.. |

Active / Log / Comm. List

| No. | Type | Doc. Name/Destination | Time | Number of Pages | Status/Result |
|---|---|---|---|---|---|
| 0012 | Public | Installation Guide and Device | 02/21 | 0 | Deleted by Error |
| 0011 | 187294 | C:¥Users¥187294¥Des | 02/21 | 1 | Completed |
| 0010 | 187294 | C:¥Users¥187294¥Des | 02/21 | 1 | Completed |
| 0009 | 187294 | C:¥Users¥187294¥Des | 02/21 | 0 | Deleted by Error |
| 0008 | COPY | | 11/22 | 10 | Completed |

Active | Log | Comm. List

Select Job Type: All

Job Filter: All Jobs / Finished Jobs / Deleted Jobs

Details...

| MACHINE STATUS | JOB LIST | HDD RECALL | SAVE | COPY | SCAN | 🌐 | 🔊 | ? |

Printing...

Machine

| | | | Printing | 0000/0200 | | | | 99.998% |
| | | | 1171 | | | | | |
| | | | Org. Counter | 1 | Memroy | | | 99.140% |
| | | | Reserved Jobs | 2 | File System | | | |

Ready to scan

Reserved Job | Incomp. Job List

| No. | MODE | STATUS | TIME (sec.) | USER NAME |
|---|---|---|---|---|
| 1171 | COPY | Outputting | 3 | --------- |
| 1172 | COPY | Reserved | 1 | --------- |
| 1173 | COPY | Reserved | 1 | --------- |

Paper Tray

| TRAY | SIZE(mm) | TYPE | | WEIGHT |
|---|---|---|---|---|
| 1 | A4 | Plain | | 62-74g/m2 |
| 2 | A4 | Plain | | 62-74g/m2 |
| 3 | B5 | Plain | | 62-74g/m2 |
| 4 | B4 | Plain | | 62-74g/m2 |
| 5 | Custom | Plain | | 62-74g/m2 |
| | | | | |
| P11 | A4 | Plain | | 62-74g/m2 |
| P12 | A4 | Plain | | 62-74g/m2 |

Consumables and Waste Information

| Toner Y | Toner M |
| Toner C | Toner K |
| Waste Toner Box | |
| Punch Waste Box | |

Outside Temp. : 0°C    Outside Humidity: 0%

| Paper Settings | Both Sides Printing | Adjustment | Controller Settings | Curl Adjustment |

FIG. 10

| MACHINE STATUS | JOB LIST | HDD RECALL | SAVE | COPY | SCAN | 💡 | 🌐 | ? |
|---|---|---|---|---|---|---|---|---|

Select a job to be processed from JOB LIST ~71

Number of Hold Jobs: 030    Org. Counter 0    Memory 99.998%
                     Reserved Jobs 0    File System 99.140%

| Hold Job | Secure Job | Schedule | Reserved Job | Spool | Output Log | Comm. Log | Incomp. Output |
|---|---|---|---|---|---|---|---|

: File Name Duplication

| Selected Job | File Name | | User Name | Last Update | Pages | Copies | |
|---|---|---|---|---|---|---|---|
| | 0120- | | | 05/31 15:21 | 5 | 1 | Select Multiple |
| | 160525_103607_ | | 0007 | 05/25 10:36 | 10 | 1 | Select All |
| | 1111 | : | | 05/24 09:38 | 5 | 1 | |
| | 1111 | : | | 05/24 09:37 | 5 | 1 | Delete |
| | test4 | × | | 05/19 16:22 | 10 | 1 | Copy |
| | 2in1simplex | × | | 05/19 16:23 | 10 | 1 | |
| | test4 | × | | 05/19 16:20 | 10 | 1 | Save to HDD |
| | test3 | × | | 05/19 16:15 | 11 | 1 | |
| | test2 | × | | 05/19 15:37 | 10 | 1 | Edit Job |
| | test1 | × | | 05/19 15:32 | 10 | 1 | Job Ticket |
| | test1 | × | | 05/19 15:30 | 4 | 1 | |
| | test1 | × | | 05/19 15:29 | 4 | 1 | Page |
| | test1 | × | | 05/19 15:17 | 4 | 1 | Combine |
| | blk2 | : | | 05/17 10:02 | 2 | 1 | |
| | blk2 | : | | 05/17 10:01 | 2 | 1 | Output |

◀ 1/2 ▶    Output and Delete    Direct Output

FIG. 11

| MACHINE STATUS | JOB LIST | HDD RECALL | SAVE | COPY | SCAN | 🌐 | 📢 | ? |
|---|---|---|---|---|---|---|---|---|

Select a job to be processed from JOB LIST — 72

Printing 0000/0200
1171
Org. Counter 1    Memory 99.998%
Reserved Jobs 2   File System 99.140%

| Hold Job | Secure Job | Schedule | Reserved Job | Spool | Output Log | Comm. Log | Incomp. Output |
|---|---|---|---|---|---|---|---|

| File Name | User Name | Status | Pages | Copies | Rem. Copies | Time (Sec.) | Doc. Count | |
|---|---|---|---|---|---|---|---|---|
| | | Printing | 1 | 20 | 20 | 1 | 1 | Hold |
| | | Reserved | 1 | 1 | 1 | 1 | 1 | Give Priority |
| | | | | | | | | Delete |
| | | | | | | | | Delete Multiple |
| | | | | | | | | Change Priority |
| | | | | | | | | To Top |
| | | | | | | | | Up |
| | | | | | | | | Down |
| | | | | | | | | To Bottom |
| | | | | | | | | Confirm Job |
| | | | | | | | | Job Ticket |

◀ 1/2 ▶

⏻ Save Job List then Power OFF

FIG. 12

| File Name | User Name | Status | Pages | Copies | Time | Doc. Count |
|---|---|---|---|---|---|---|
| | | Completed | 1 | 1 | 16:59 | 1 |
| | | Completed | 1 | 1 | 16:58 | 1 |
| | | Completed | 1 | 1 | 16:58 | 1 |
| | | Completed | 1 | 1 | 16:58 | 1 |
| | | Completed | 1 | 1 | 16:58 | 1 |
| | | Completed | 1 | 1 | 16:55 | 1 |
| | | Completed | 1 | 1 | 16:45 | 1 |

MACHINE STATUS | JOB LIST | HDD RECALL | SAVE | COPY | SCAN

Select a job to be processed from JOB LIST

Printing 1171
Org. Counter 0000/0200
Reserved Jobs 1
2

Memroy 99.998%
File System 99.140%

Hold Job | Secure Job | Schedule | Reserved Job | Spool | Output Log | Comm. Log | Incomp. Output Details..

◀ 1/2 ▶

Save Job List then Power OFF

IMAGE FORMING APPARATUS, NON-TRANSITORY COMPUTER-READABLE RECORDING MEDIUM STORING DISPLAY CONTROL PROGRAM, AND DISPLAY CONTROL METHOD

CROSS REFERENCE TO RELATED APPLICATIONS

This application claims priority to Japanese Patent Application No. 2018-075134, filed on Apr. 10, 2018, the entire content of which is incorporated herein by reference.

TECHNOLOGICAL FIELD

The present disclosure is directed to image forming apparatuses, non-transitory computer-readable recording media each storing a display control program, and display control methods. In particular, the present disclosure is directed to image forming apparatuses each equipped with functions of both an office printer and a production printer, non-transitory computer-readable recording media each storing a display control program for controlling operations to display screens on the image forming apparatus, and display control methods.

BACKGROUND

An office printer and a production printer are used by operators for different purposes from each other, and operators operate the respective printers with placing importance on different functions of the printers. For this reason, these printers are configured to display screens designed in consideration with the usability of the different functions on which operators of the respective printers tend to place importance.

In recent years, image forming apparatuses each equipped with functions of both an office printer and a production printer (so as to serve as both an office printer and a production printer) have been proposed. Such image forming apparatuses are expected to be operated by operators on screens displayed in a display mode suitable for the operator's purpose, such as a display mode for office printing, for an operator who wants to use the printer as an office printer, or a display mode for production printing, for an operator who wants to use the printer as a production printer.

In a case that one image forming apparatus equipped with functions of an office printer and a production printer, is simultaneously used by operators as an office printer and as a production printer, it is desirable that screens displayed by the apparatus can be switched timely to be suitable for each operator who is using the functions of an office printer or the functions of an production printer.

As an example of a technique relating to switching-over of screens in an image forming apparatus, Japanese Unexamined Patent Publication (JP-A) No. 2008-247039 discloses the following image forming apparatus, though it is not an image forming apparatus equipped with functions of both an office printer and a production printer. The image forming apparatus includes an operation and display unit configured to switch a plurality of screens for configuring job settings, to display one of the screens, where the plurality of screens include a main screen and a plurality of function-list screens that are accessible from the main screen. The operation and display unit is configured to display the function-list screens in a normal display mode or a simple display mode, where each of the function-list screens in the normal display mode shows a plurality of function-selection keys for switching the currently displayed screen to respective function screens, and each of the function-list screens in the simple display mode shows a part of the function-selection keys to be displayed on the corresponding function-list screen in the normal display mode. Each of the function-list screens includes a display-mode switch that switches between the normal display mode and the simple display mode.

With the technique disclosed in JP-A No. 2008-247039, for example, a software key can be located in an initial screen (such as a standby screen of the copy mode, or a screen that allows an operator to select one of the copy mode, the scan mode and other operation modes) so as to allow an operator to change the display mode of the screen (in other words, switch between the normal display mode and the simple display mode in accordance with the preference or proficiency degree of the operator). By utilizing this technique in an image forming apparatus equipped with functions of both an office printer and a production printer, it allows an operator to switch between a screen for office printing and a screen for production printing by operator's operations on the software key whenever the operator wants. That is, in a case that the image forming apparatus equipped with functions of both types of printers, performs job processing, in accordance with operator's instructions on a screen displayed by the image forming apparatus, the image forming apparatus can present screens in a suitable display mode to an operator, by prompting the operator to select one of office printing and production printing in the beginning of the job processing.

In another case that the image forming apparatus performs processing of a print job, the image forming apparatus starts the job processing in response to receiving the print job from a client terminal, and it is not necessary for an operator to operate the image forming apparatus at this time. It means that, in most cases, the operator does not contact with a user interface of the image forming apparatus on or before sending the print job to the image forming apparatus. The operator will actually contact with the user interface of the image forming apparatus for the first time in the job processing, on the following situation after sending the print job: at the time of troubleshooting, confirming the status of the job, canceling the job, or the like, on a screen other than a setting screen of the image forming apparatus.

For this reason, in the image forming apparatus that controls screens according to the technique disclosed in the JP-A No. 2008-247039, it is necessary for an operator who wants to operate screens in the display mode according to the operator's purpose, to change the display mode by hand, at the time of troubleshooting, at the time of confirming the status of the job, at the time of canceling the job, or the like, which is troublesome for the operator.

When an operator switches the display mode on a comparatively intelligible and familiar screen like a main screen, erroneous operations and confusion of the operator are hard to occur. However, when the image forming apparatus presents a screen in a unfamiliar display mode, to an operator who is operating in a harry, for example, at the time of troubleshooting, at the time of confirming the status of the job, at the time of canceling the job, or the like, it will get the operator into the situation that the operator has to perform operations on an unfamiliar screen.

In other words, an office printer and a production printer display screens in different display modes (for example, different in the layout, expressing manner and contents of the screen) depending on the operator's use of the printer, even if the screens in different display modes relate to the same functions. Since the difference of the display modes greatly affects the operator's impression of the screen, a screen in an unexpected and unfamiliar display mode that has been displayed suddenly, easily causes erroneous operations and confusion of the operator, which prevents operator's quick and proper operations.

SUMMARY

The present disclosure is directed to image forming apparatuses, non-transitory computer-readable recording media each storing a display control program and display control methods, which may allow an operator to operate the image forming apparatus by using screens displayed in a display mode suitable to the operator's use of the functions of the image forming apparatus, without operator's operations to switch the display mode.

An image forming apparatus reflecting one aspect of the present disclosure may be an image forming apparatus comprising: a printer engine configured to form images on printing media; a display configured to display screens each relating to a certain function of the image forming apparatus, in different display modes according to operator's use of the function; and a hardware processor that performs the following operations. The operations may include, in response to receiving a job which gives print instructions to the printer engine, analyzing the job; determining which of a first display mode and a second display mode being different from the first display mode, is to be used for displaying the screens, on the basis of information contained in the job; and causing the display to display one or more screens showing information about the job, in the determined one of the first display mode and the second display mode.

A non-transitory computer-readable recording medium reflecting one aspect of the present disclosure may store a display control program to be executed in an apparatus. The apparatus includes a hardware processor configured to control a printer engine that forms images on printing media, and a display configured to display screens each relating to a certain function of the apparatus or the printer engine, in different display modes according to operator's use of the function. The program comprises instructions which, when executed by the hardware processor of the apparatus, may cause the hardware processor to perform the following operations. The operations may comprise: in response to receiving a job which gives print instructions to the printer engine, analyzing the job; determining which of a first display mode and a second display mode being different from the first display mode, is to be used for displaying the screens, on the basis of information contained in the job; and causing the display to display one or more screens showing information about the job, in the determined one of the first display mode and the second display mode.

A method reflecting one aspect of the present disclosure may be a display control method for use in a printing system. The printing system may include a printer engine that forms images on printing media, and an apparatus including a hardware processor configured to control the printer engine and a display configured to display screens each relating to a certain function of the apparatus or the printer engine, in different display modes according to operator's use of the function. The method may comprise: in response to receiving a job which gives print instructions to the printer engine, analyzing the job, by the hardware processor; determining which of a first display mode and a second display mode being different from the first display mode, is to be used for displaying the screens, on the basis of information contained in the job, by the hardware processor; and causing, by the hardware processor, the display to display one or more screens showing information about the job, in the determined one of the first display mode and the second display mode.

BRIEF DESCRIPTION OF THE DRAWINGS

The advantages and features provided by one or more embodiments of the disclosure will become more fully understood from the detailed description given hereinbelow and the appended drawings which are given by way of illustration only, and thus are not intended as a definition of the limits of the present invention, wherein:

FIG. 7 is a schematic diagram illustrating an example of a screen (active job screen) for office printing displayed on the image forming apparatus according to an embodiment of the present disclosure;

FIG. 8 is a schematic diagram illustrating an example of a screen (log screen) for office printing displayed on the image forming apparatus according to an embodiment of the present disclosure;

FIG. 9 is a schematic diagram illustrating an example of a screen (top menu screen) for production printing displayed on the image forming apparatus according to an embodiment of the present disclosure;

FIG. 10 is a schematic diagram illustrating an example of a screen (job list screen) for production printing displayed on the image forming apparatus according to an embodiment of the present disclosure;

FIG. 11 is a schematic diagram illustrating an example of a screen (reserved job screen) for production printing displayed on the image forming apparatus according to an embodiment of the present disclosure;

FIG. 12 is a schematic diagram illustrating an example of a screen (output log screen) for production printing displayed on the image forming apparatus according to an embodiment of the present disclosure;

DETAILED DESCRIPTION OF EMBODIMENTS

Figure 1:
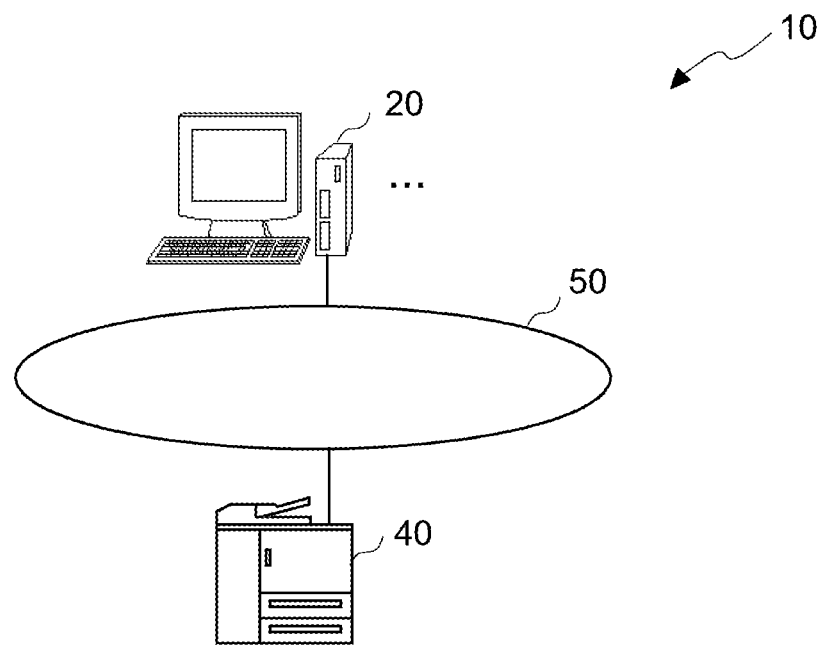
FIG. 1 is a schematic diagram illustrating an example of the constitution of a printing system according to an embodiment of the present disclosure.

Hereinafter, one or more embodiments of the present disclosure will be described with reference to the drawings. However, the scope of the disclosure is not limited to the illustrated embodiments.

As indicated, an office printer and a production printer are used by operators for different purposes from each other, and operators operate the respective printers with placing importance on different functions of the printers. For this reason, these printers are configured to display screens designed in consideration with the usability of the different functions on which operators of the respective printers tend to place importance. On the other hand, image forming apparatuses each equipped with functions of both an office printer and a production printer, are expected to be operated by operators on screens displayed in a display mode suitable for the operator's purpose, such as a display mode for office printing, for an operator who wants to use the printer as an office printer, or a display mode for production printing, for an operator who wants to use the printer as a production printer.

The characteristics of each of the display mode for office printing and the display mode for production printing are as follows. First, the display mode for office printing, provides screens designed to be simple and convenient so that operators who are not so familiar with operations of the printer can easily understand the contents of the screens. In this display mode, a large part of each screens for copying is occupied with an output image (under the default settings). Moreover, since most operators may not place importance on the type of printing media (printing paper), screens in this display mode present a small amount of information with regard to the type of printing paper. Next, the display mode for production printing, provides screens designed to allow operators who are familiar with operations of the printer to perform operations efficiently on the screens, and designed to allow the operators to perform operations for a great number of matters on each screen. In this display mode, since most operators place importance on a matter capable of printing with high image quality for various types of printing paper, a large part of each screens for copying is occupied with settings about a type of printing paper and a selection of a paper tray (under the default settings).

As described above, screens of an image forming apparatuses equipped with functions of both an office printer and a production printer, are different in characteristics of the display mode between office printing and production printing. Therefore, it is desirable that the image forming apparatuses is configured to switch over the display mode of screens timely so as to be suitable for operators using functions of an office printer or a production printer. With regard to the switching over of screes, JP-A No. 2008-247039 discloses the technique to switch over the display mode of a screen with a software key located on the screen. By utilizing this technique in an image forming apparatus equipped with functions of both an office printer and a production printer, it allows an operator to switch between a screen for office printing and a screen for production printing, by operator's operations on the software key whenever the operator wants.

However, in a case that an operator causes the image forming apparatus to process a print job, the operator will actually contact with the user interface of the image forming apparatus for the first time in the job processing, on the following situation after sending the print job: at the time of troubleshooting, confirming the state of the job, canceling the job, or the like, on a screen other than a setting screen of the image forming apparatus. It is necessary for the operator to change the display mode in accordance with the operator's purpose, by operator's hand, under these situations, which becomes troublesome for the operator.

Figure 13A:
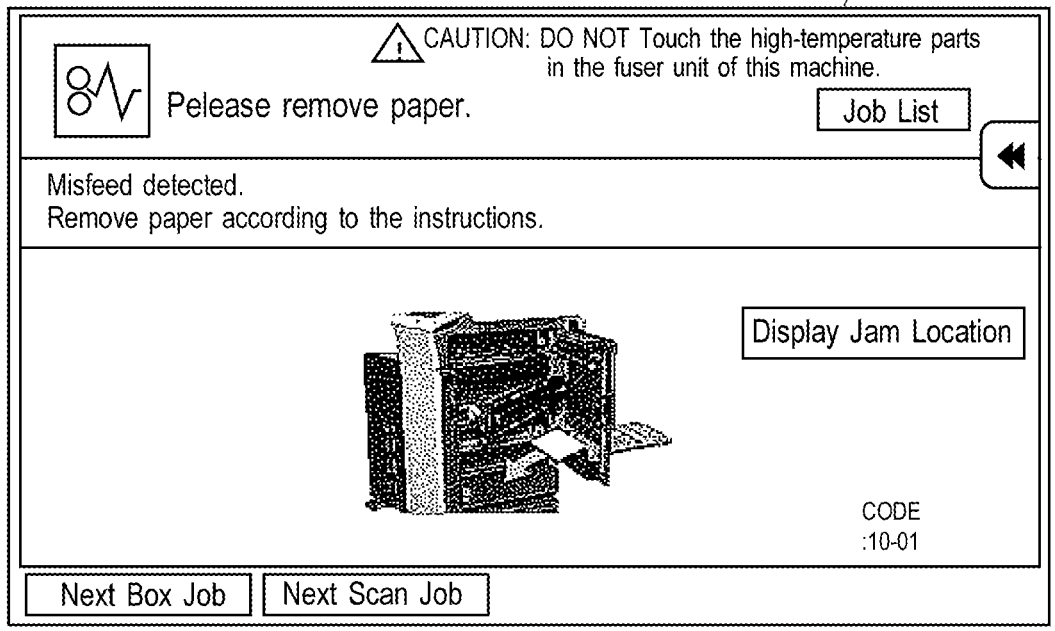
FIGS. 13A and 13B each is a schematic diagram illustrating an example of a screen (paper-jam error screen) of an office printer.
Figure 13B:
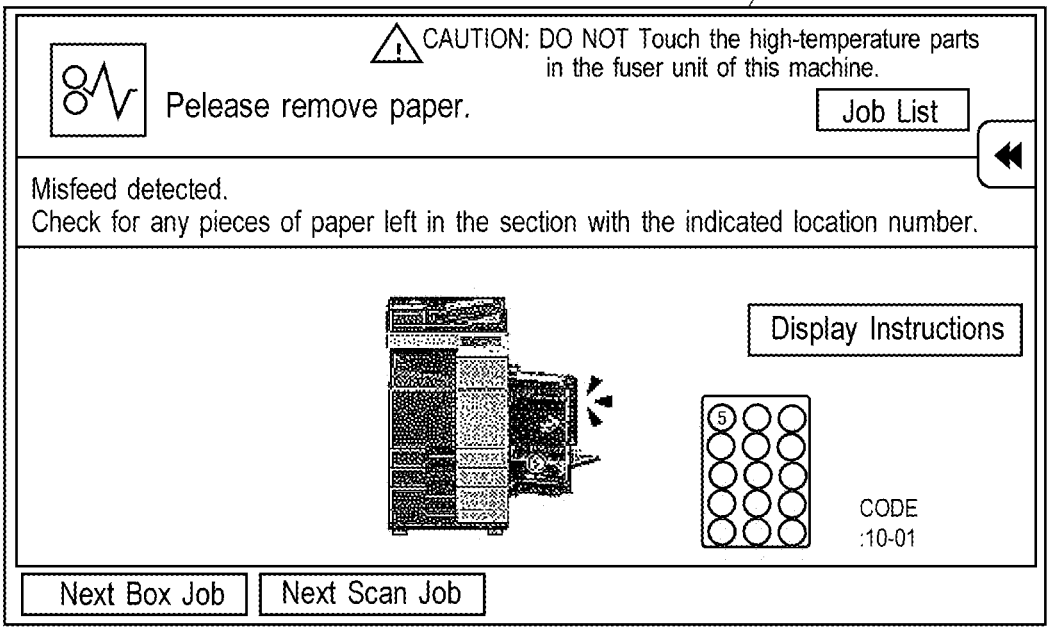
Figure 14:
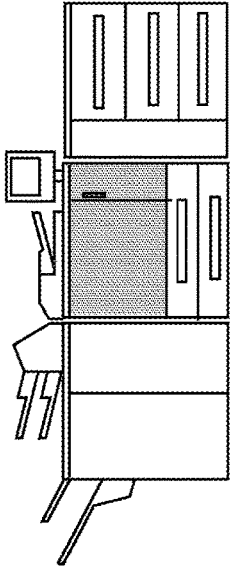
FIG. 14 is a schematic diagram illustrating an example of a screen (paper-jam error screen) of a production printer.

When the image forming apparatus presents a screen in a unfamiliar display mode, to an operator who is operating in a harry, for example, at the time of troubleshooting, at the time of confirming the state of the job, at the time of canceling the job, or the like, it will get the operator into the situation that the operator has to operate on an unfamiliar screen. For example, under the situation that a paper jam occurs in an office printer, which are operated by operators who are not experts in operations of the printer in many cases, the office printer displays paper-jam error screens 80 that indicates the approximate location of the paper jam and the way to clear the paper jam graphically as illustrated in FIGS. 13A and 13B. On the other hand, under the situation that a paper jam occurs in a production printer, which are operated by operators who are experts in operations of the printer in many cases, the production printer displays paper-jam error screens 81 that indicates the exact location of the paper jam and the way to clear the jam simply on a character basis (for example, the location is indicated with a technical term like " the vertical conveyance door") as illustrated in FIG. 14.

In other words, an office printer and a production printer display screens in different display modes (for example, different in the layout, expressing manner and contents of the screen) depending on the operator's use of the printer, even if the screens in different display modes relate to the same functions. Since the difference of the display modes greatly affects the operator's impression of the screen, a screen in an unexpected and unfamiliar display mode that has been displayed suddenly, easily causes erroneous operations and confusion of the operator, which prevents operator's quick and proper operations.

In view of that, the following technique to control operations to display screens on an image forming apparatus equipped with functions of both an office printer and a production printer (or an apparatus for controlling a printer engine), is provided as an embodiment of the present disclosure. That is, in response to receiving a job that has been submitted to the image forming apparatus (or the apparatus), a hardware processor of the image forming apparatus (or a hardware processor of the apparatus) analyzes the job; and determines which of a first display mode (the display mode for office printing) and a second display mode (the display mode for production printing) is to be used for displaying screens, on the basis of information contained in the job. The hardware processor then causes a display of the image forming apparatus (or a display of the apparatus) to display one or more screens showing information about the job, in the determined display mode. Examples of the information contained in the job, to be used when determining which of the first display mode and the second display mode is to be used, include the number of pages to be printed and/or the number of copies to be printed; the type of printing media to be used for the job; the type of a printer driver that submitted the job to the image forming apparatus and/or settings for the printer driver; settings for a finishing process; and settings for an external controller that has sent the job to the image forming apparatus.

Further, the first display mode and the second display mode are different from each other according to the operator's use of the image forming apparatus. For example, each screen in the second display mode may be designed to show a greater number of items than items shown in a corresponding screen in the first display mode. For another example, each screen in the second display mode is designed to show at least an item about weight of printing media, and each screen in the first display mode is designed to show one or more items about other than weight of printing media.

The above-described control operations allow an operator to operate the image forming apparatus (or an apparatus for controlling a printer engine), by using screens displayed in a display mode suitable to the operator's use of the functions of the image forming apparatus, without operator's operations to switch the display mode. Further, the above-described control operations avoid erroneous operations and confusion of operators that originate from operations performed on a screen in an unexpected and unfamiliar display mode, which realizes operator's quick and proper operations on the image forming apparatus.

Embodiment

Figure 2:
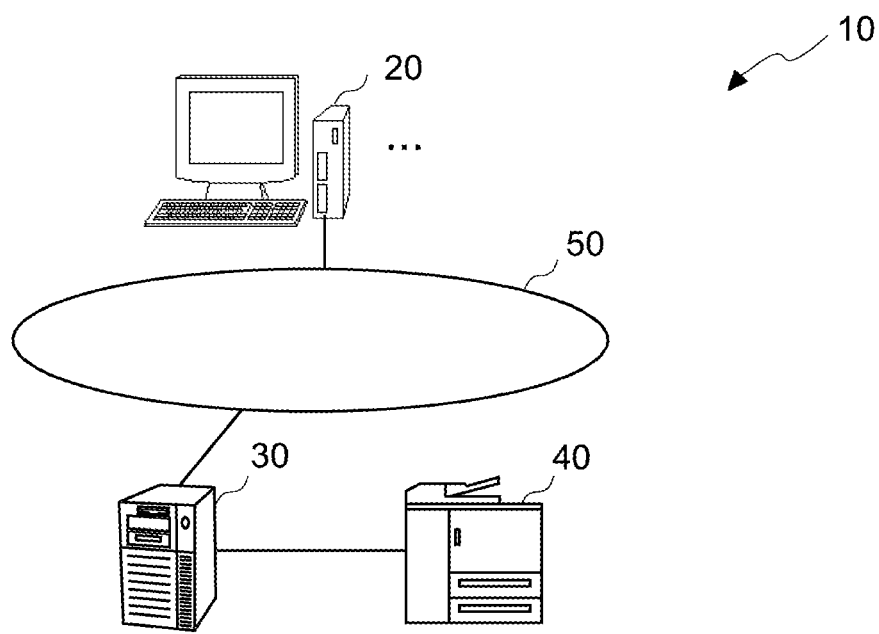
FIG. 2 is a schematic diagram illustrating another example of the constitution of a printing system according to an embodiment of the present disclosure.
Figure 3A:
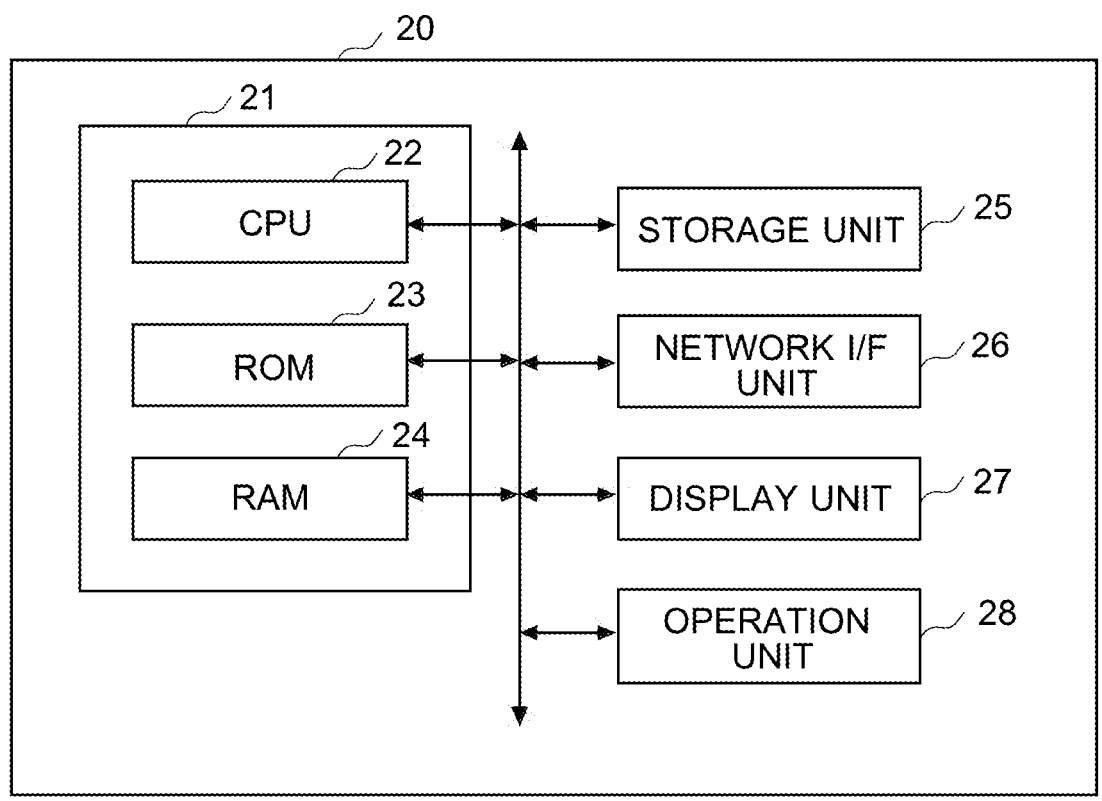
FIGS. 3A and 3B are block diagrams illustrating an example of the constitution of a client terminal according to an embodiment of the present disclosure.
Figure 3B:
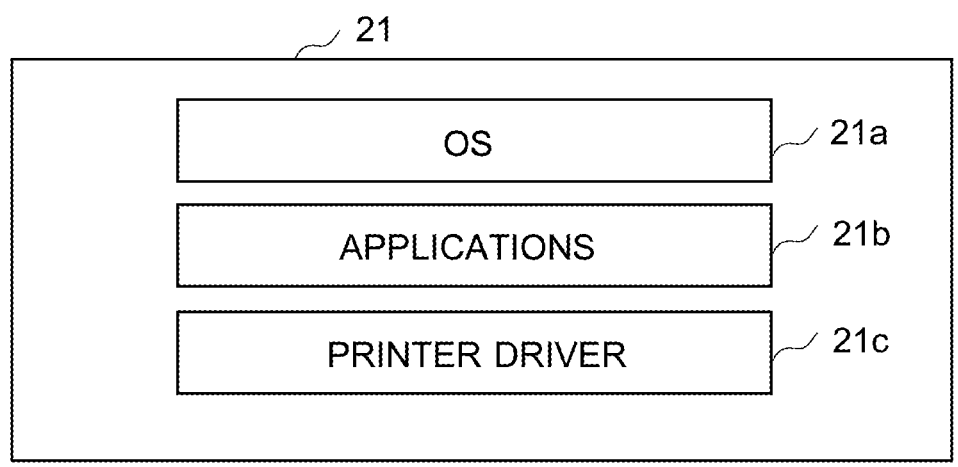
Figure 4A:
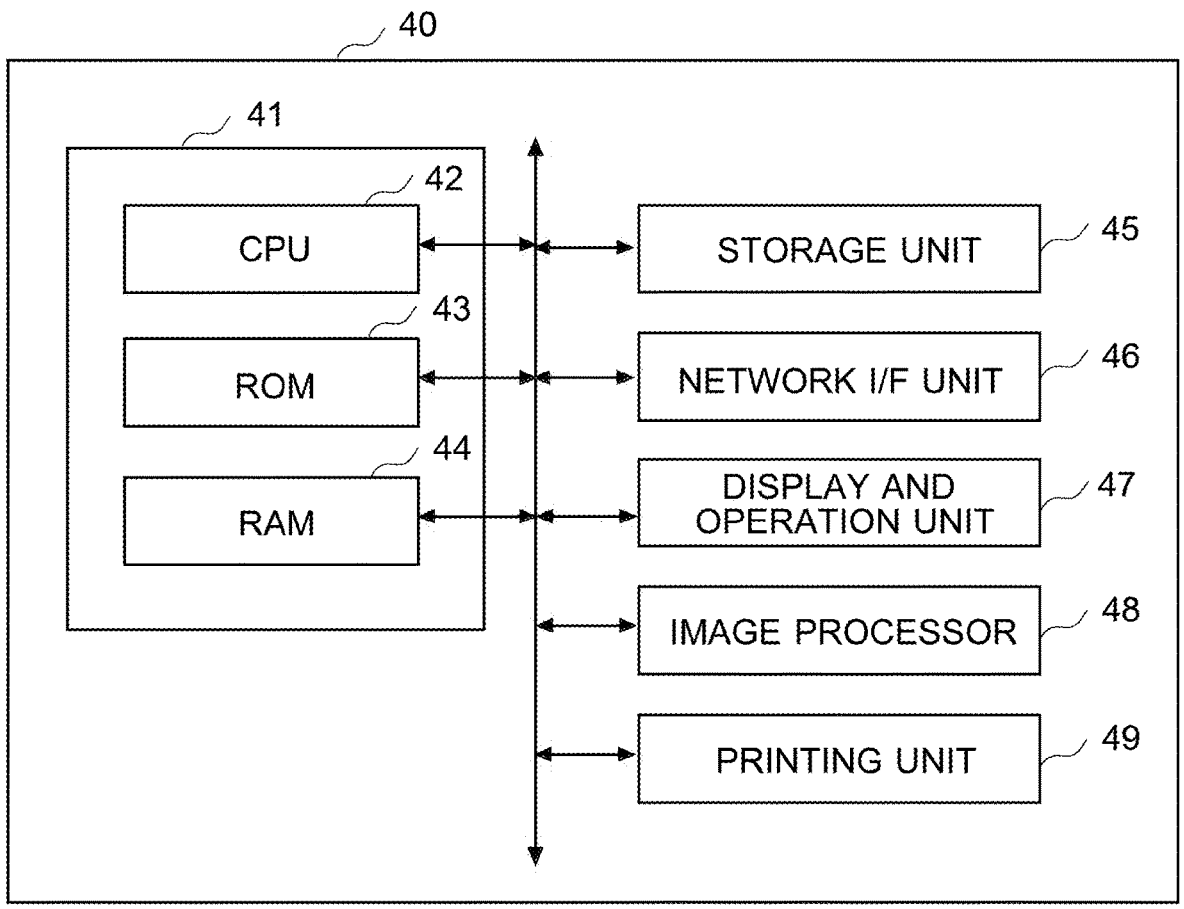
FIGS. 4A and 4B are block diagrams illustrating an example of the constitution of an image forming apparatus according to an embodiment of the present disclosure.
Figure 4B:
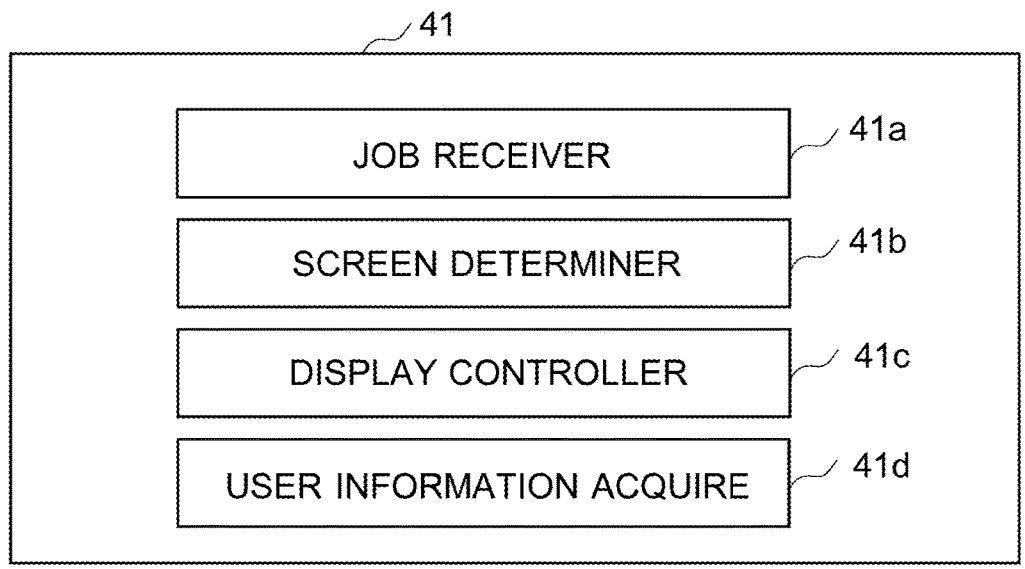
Figure 5:
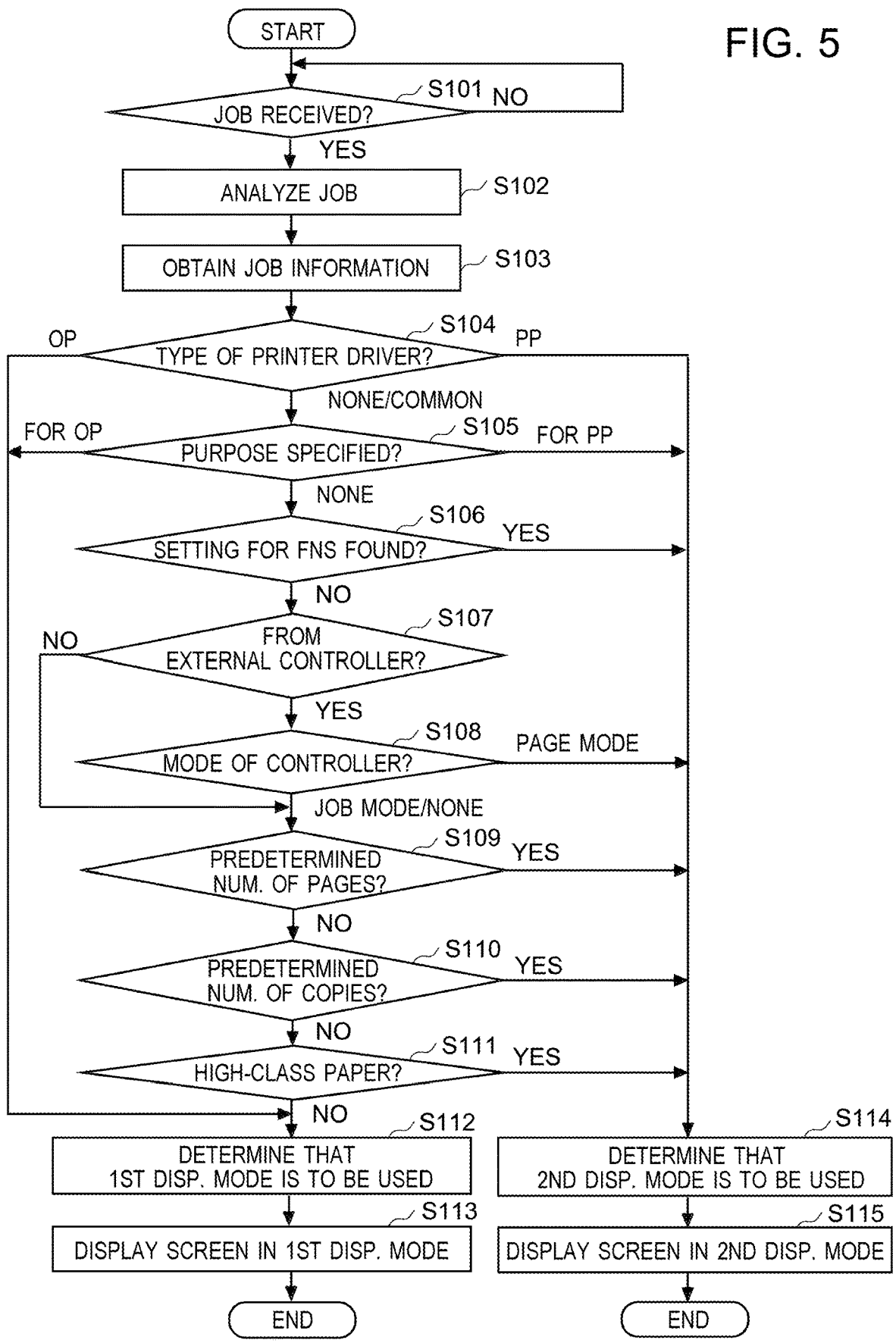
FIG. 5 is a flowchart illustrating an example of operations of the image forming apparatus according to an embodiment of the present disclosure.
Figure 6:
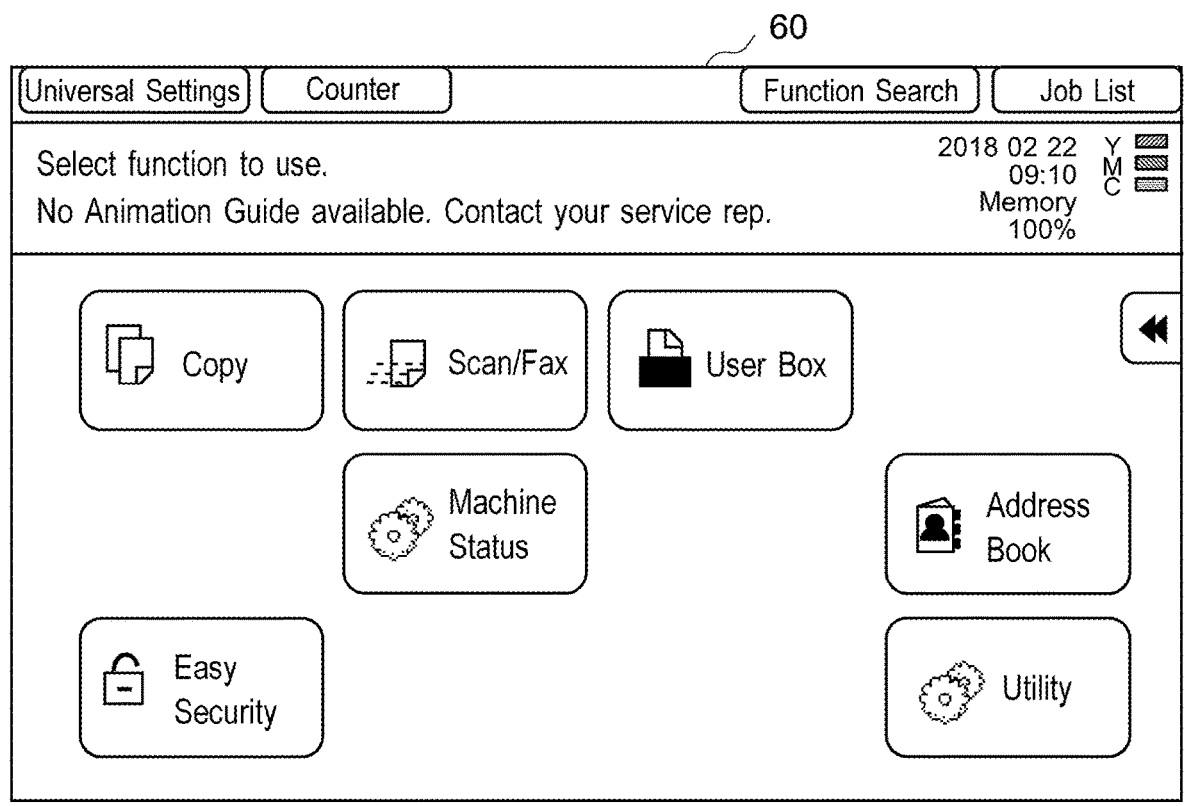
FIG. 6 is a schematic diagram illustrating an example of a screen (top menu screen) for office printing displayed on the image forming apparatus according to an embodiment of the present disclosure.

In order to describe an embodiment of the present disclosure in more in detail, a description is given of an image forming apparatus, a non-transitory computer-readable recording medium storing a display control program, and a display control method, with reference to FIG. 1 through FIG. 12. FIG. 1 and FIG. 2 each is a schematic diagram illustrating an example of the constitution of a printing system according to the present embodiment. FIGS. 3A and 3B are block diagrams illustrating an example of the constitution of a client terminal according to the present embodiment. FIGS. 4A and 4B are block diagrams illustrating an example of the constitution of an image forming apparatus according to the present embodiment. FIG. 5 is a flowchart illustrating an example of operations of the image forming apparatus according to the present embodiment. FIGS. 6 to 8 each is a schematic diagram illustrating an example of a screen for office printing. FIGS. 9 to 12 each is a schematic diagram illustrating an example of a screen for production printing.

As illustrated in FIG. 1, printing system 10 according to the present embodiment includes at least one client terminal 20 and image forming apparatus 40. These apparatuses are communicably connected to each other via communication network 50, where examples of the communication network 50 include a LAN (Local Area Network) and WAN (Wide Area Network) defined by specifications, such as Ethernet, Token Ring and FDDI (Fiber-Distributed Data Interface). Though printing system 10 in FIG. 1 includes at least one client terminal 20 and image forming apparatus 40, printing system 10 may further include external controller 30 communicably connected to communication network 50 and communicably connected to image forming apparatus 40 with a LAN, a WAN or an exclusive line supporting, for example, PCI (Peripheral Component Interconnect) communication. Hereinafter, a description of each apparatus in printing system 10 is given on the assumption of the constitution of printing system 10 illustrated in FIG. 1.

Client Terminal

Client terminal 20 is a computing device like a personal computer and is configured to send a job to image forming apparatus 40 (or external controller 30). Client terminal 20 includes, as illustrated in FIG. 3A, built-in controller 21, storage unit 25, network interface (I/F) unit 26, display unit 27 and operation unit 28.

Built-in controller 21 includes CPU (Central Processing Unit) 22 as a hardware processor, and memories including ROM (Read Only Memory) 23 and RAM (Random Access Memory) 24. CPU 22 reads out control programs stored in ROM 23 or storage unit 25, loads the control programs onto RAM 24, and executes the control programs, thereby controlling operations of the components of client terminal 20.

As illustrated in FIG. 3B, built-in controller 21 (CPU 22) is configured to execute OS (Operating System) 21a, applications 21b and printer driver 21c.

Examples of OS 21a include Microsoft Windows, macOS and Android, where Microsoft and Windows are either registered trademarks or trademarks of Microsoft Corporation in the United States and/or other countries, macOS is a registered trademark or trademark of Apple Inc. in the United States and/or other countries, and Android is a registered trademark or trademark of Google Inc. in the United States and/or other countries. OS 11a manages application programs including applications 21b and printer driver 21c in client terminal 20 so as to function and run the application programs.

Applications 21b include, for example, an application program for creating documents, which, on sending print instructions, invokes printer driver 21c and transfers data created by one of applications 21b to printer driver 21c by being executed by CPU 22.

Printer driver 21c converts document data created by one of applications 21b into job data in a language that image forming apparatus 40 (or external controller 30) can interpret, and sends the job data to image forming apparatus 40 (or external controller 30), by being executed by CPU 22, where examples of the job data include PDL (Page Description Language) data written in page description languages, such as PJL (Printer Job Language), PS (PostScript) and PCL (Printer Control Language); and PDF (Portable Document Format) data. When being executed, the printer driver 21c causes display unit 27 to display a print setting screen, writes settings (such as the number of pages be printed, the number of copies to be printed, the weight of printing media, the type of printing media, the type of printer driver, a selection between office printing and production printing, and settings for a finishing process, in the present embodiment) specified on the screen into a print ticket, and adds the print ticket to the job data.

Storage unit 25 is a non-transitory computer-readable recording medium including a HDD (Hard Disk Drive) and/or a SSD (Solid State Drive), which stores programs which when being executed causes CPU 22 to control the components of client terminal 20, document data, job data, and other data.

Network I/F unit 26 includes a NIC (Network Interface Card) and/or a modem. Network I/F unit 26 communicably connects client terminal 20 to communication network 50 so as to send a job to image forming apparatus 40 (or external controller 30).

Display unit 27 includes a display like a LCD (liquid crystal display) or an OEL (organic electroluminescence) display, so as to display various screens including document creation screens of applications 21b, and a print setup screen of printer driver 21c.

Operation unit 28 includes input devices, such as a mouse and a keyboard, which allows an operator to perform various operations including operations for creating a document by using one of applications 21b and operations for configuring print settings by using printer driver 21c.

Image Forming Apparatus

Image forming apparatus 40 is an apparatus configured to perform print processing according to a job received from client terminal 20, where examples of image forming apparatus 40 include a MFP (multi-functional peripheral). In the present embodiment, image forming apparatus 40 has functions of both an office printer and a production printer. Image forming apparatus 40 includes, as illustrated in FIG. 4A, built-in controller 41, storage unit 45, network interface (I/F) unit 46, display and operation unit 47, image processor 48 and printing unit 49.

Built-in controller 41 includes CPU 42 as a hardware processor, and memories including ROM 43 and RAM 44. CPU 42 reads out control programs stored in ROM 43 or storage unit 45, loads the control programs onto RAM 44, and executes the control programs, thereby controlling operations of the components of image forming apparatus 40. As illustrated in FIG. 4B, built-in controller 41 (CPU 42) is configured to work as job receiver 41a, screen determiner 41b, display controller 41c and user information acquirer 41d.

Job receiver 41a is configured to receive a job submitted from client terminal 20 and perform the following operations. In response to receiving a job, job receiver 41a analyzes the job, sends instructions to perform image formation (print instructions) on the basis of the job to printing unit 49, and sends screen determiner 41b information of the job.

Screen determiner 41b is configured to perform the following operations. In response to receiving the job information from the job receiver 41a, screen determiner 41b uses the job information to determine which of a display mode for office printing (referred to as the first display mode) and a display mode for production printing, is to be used for displaying screens, and sends the determination result to display controller 41c. Examples of the job information includes the number of pages to be printed and/or the number of copies to be printed; settings for printing paper (the type of printing media); the type of printer driver 21c and/or settings for the printer driver 21c; settings for a finishing process; and settings for an external controller that has sent the job (including a selection of a data sending mode between a page mode and a job mode). If a screen that is going to be displayed is not a screen for a certain job (if there is no job information), screen determiner 41b, as needed, requests user information acquirer 41d to acquire user information. Then, on the basis of the user information acquired through user information acquirer 41d, screen determiner 41b determines which of the first display mode and the second display mode is to be used for displaying the screen, and sends the determination result to display controller 41c. The details of this operation of screen determiner 41b will be mentioned later.

In many cases of print processing for production printing, operators of image forming apparatus 40 are experts in operations of image forming apparatus 40. Therefore, each screen for production printing of image forming apparatus 40 is designed to show a greater number of items as compared with those shown in a corresponding screen for office printing. In order to realize printing with high image quality and high productivity, screens for production printing of image forming apparatus 40 are designed to allow operators to configure detailed settings for printing media. Therefore, screens for production printing each is designed to show at least an item about weight of printing media. On the other hand, screens for office printing of image forming apparatus 40 each is designed to show one or more items about other than weight of printing media (on other words, designed to include no item about weight of printing media), so as to allow operators to configure rough settings on the screens, from the viewpoint of user-friendliness.

Display controller 41c is configured to perform the following operations. In response to receiving the determination result from screen determiner 41b, display controller 41c causes display and operations unit 47 to display one or more screens showing information about the received job, in one of the first display mode and the second display mode in accordance with the determination result. In response to operator's instructions to select or edit an item on the screen, display controller 41c send printing unit 49 instructions to change the image forming (print processing) according to the operator's instructions. Displaying a screen not for end-users, like a screen directed to a servicemen, display controller 41c may cause display and operations unit 47 to display the screen in a display mode for a service use (referred to as the third display mode).

User information acquirer 41d is configured to perform the following operations. In response to receiving a request for acquiring user information, from screen determiner 41b, user information acquirer 41d acquires user information memorized in storage unit 45 or another components of image forming apparatus 40, and sends screen determiner 41b the user information corresponding to the operator who is using image forming apparatus 40. The user information is registration information about an operator of image forming apparatus 40, identified by authentication with input of ID or password, authentication with an ID card, fingerprint authentication, or the like, and an identification method for it is not limited. In the case of having failed the acquirement of the user information, user information acquirer 41d may notify screen determiner 41b of the matter of having failed the acquirement.

The job receiver 41a, screen determiner 41b, display controller 41c and user information acquirer 41d may be constituted as hardware devices. Alternatively, the job receiver 41a, screen determiner 41b, display controller 41c and user information acquirer 41d (particularly, job receiver 41a, screen determiner 41b and display controller 41c) may be provided by a display control program which causes built-in controller 41 to function as these components when being executed by CPU 42. That is, built-in controller 41 may be configured to serve as the job receiver 41a, screen determiner 41b, display controller 41c and user information acquirer 41d (particularly, job receiver 41a, screen determiner 41b and display controller 41c), when CPU 42 executes the display control program.

Storage unit 45 is a non-transitory computer-readable recording medium including a HDD and/or a SSD. Storage unit 45 stores programs which, when being executed, cause CPU 42 to control the components of image forming apparatus 40; information about processing and functions of image forming apparatus 40; job data; image data for printing, created by image processor 48; user information; and other data.

Network I/F unit 46 includes a NIC and/or a modem. Network I/F unit 46 communicably connects image forming apparatus 40 to communication network 50 so that image forming apparatus 40 can receive a job from client terminal 20.

Display and operation unit 47 is configured to display various screens and allow an operator to perform various kinds of operations on the screens. Examples of the display and operation unit 47 include a touch screen in which a pressure-sensitive operation unit (a touch sensor) composed of lattice-shaped transparent electrodes is arranged on a display unit. In the present embodiment, display and operation unit 47 is configured to display screens each relating to a certain function of image forming apparatus 40, in different display modes according to the operator's use of the function. For example, display and operation unit 47 can display various screens for office printing (including the top menu screen, the active job list screen, and the log screen, which will be described later), and various screens for production printing (including the top menu screen, the job list screen, the reserved job list screen, and the output log screen, which will be described later). In the present embodiment, a touch screen, in which a display unit and an operation unit are housed in one body, is employed as an instance of display and operation unit 47, but a display unit and an operation unit as separated bodies may be employed as an instance of display and operation unit 47.

Image processor 48 serves as a RIP (raster image processor) and is configured to translate a job into intermediate data (an intermediate format called the display list or DL), and then rasterizes pages of the document in the job to create bitmap image data. Image processor 48 is further configured to perform image processing, such as screening, tone correction, density-balance adjustment, thinning, halftoning and other processing, on image data as needed, and output the resulting image data to printing unit 49.

Printing unit (printer engine) 49 is configured to perform the following operations. Printing unit 49 receives instructions to perform image formation (print processing) from job receiver 41a and/or instructions to change the image formation (print processing) from display controller 41c, then, performs the image formation (print processing), and notifies display controller 41c of the status of the image formation (print processing). In the case where the image formation of another job is being executed, printing unit 49 may wait for the completion of the image formation of the job; and upon completion of the image formation of the job, may execute the image formation of the instructed job. Accordingly, printing unit 49 is configured to hold the execution of the instructed job so that an operator can change or cancel the job arbitrarily.

It should be noted that FIG. 1 to FIG. 4B illustrated an example of printing system 10 according to the present embodiment for illustrative purpose only, and the constitution and operations of each apparatus in the system may be modified appropriately, as far as the above-described operations of image forming apparatus 40 can be executed in the system. For example, built-in controller 41 of image forming apparatus 40 in FIG. 4B is configured to work as job receiver 41a, screen determiner 41b, display controller 41c and user information acquire 41d (when the display control program is executed by CPU 42). On the other hand, in another example of printing system 10, which further includes external controller 30, the built-in controller of external controller 30 may be configured to control a printing unit (or a printer engine) in the printing system 10, which forms images on printing media, and configured to work as the job receiver, the screen determiner, display controller and user information acquire (when the display control program is executed by the CPU of the built-in controller), so as to cause the display of external controller 30 to display screens each relating to a certain function of the external controller 30 or the printing unit, in different display modes according to operator's use of the function, in place of built-in controller 41 of image forming apparatus 40.

Operations of Image Forming Apparatus

Hereinafter, a description is given of concrete operations of image forming apparatus 40 according to the present embodiment. CPU 42 of image forming apparatus 40 reads out the display control program stored in ROM 43 or storage unit 45, loads the program onto RAM 44, and execute the program, thereby executing the steps of the flowchart illustrated in FIG. 5. In FIG. 5, office printing is abbreviated as OP, production printing is abbreviated as PP, and a finishing process is abbreviated as FNS.

First, built-in controller 41 (job receiver 41a) monitors a job sent from client terminal 20 (Step S101). In response to receiving a job from client terminal 20 (YES in Step S101), built-in controller 41 (job receiver 41a) analyzes the job and sends information of the job (job information) to screen determiner 41b (Step S102). In response to obtaining the job information (Step S103), built-in controller 41 (screen determiner 41b) determines the display mode to be used as follows, on the basis of the job information.

At first of the determination of the display mode, built-in controller 41 (screen determiner 41b) determines the type of a printer driver used for preparing the job, on the basis of the job information (Step S104). On determining that the printer driver is directed to office printers, built-in controller 41 (screen determiner 41b) determines that screens are to be displayed in the first display mode (the display mode for office printing) (Step S112). Built-in controller 41 (display controller 41c) then causes display and operation unit 47 to display screens in the first display mode (Step S113). On determining that the printer driver is directed to production printers, built-in controller 41 (screen determiner 41b) determines that screens are to be displayed in the second display mode (the display mode for production printing) (Step S114). Built-in controller 41 (display controller 41c) then causes display and operation unit 47 to display screens in the second display mode (Step S115). On finding no information about the type of the printer driver, or determining that the printer driver is directed to a multiple or common use for both office printers and production printers, built-in controller 41 (screen determiner 41b) executes the next step (Step S105).

Built-in controller 41 (screen determiner 41b) then determines whether settings for printer driver 21c includes settings for office printing or settings for production printing (Step S105). On determining that the settings for printer driver 21c includes settings for office printing, built-in controller 41 (screen determiner 41b) determines that screens are to be displayed in the first display mode (the display mode for office printing) (Step S112). Built-in controller 41 (display controller 41c) then causes display and operation unit 47 to display screens in the first display mode (Step S113). On determining that the settings for printer driver 21c includes settings for production printing, built-in controller 41 (screen determiner 41b) determines that screens are to be displayed in the second display mode (the display mode for production printing) (Step S114). Built-in controller 41 (display controller 41c) then causes display and operation unit 47 to display screens in the second display mode (Step S115). On finding no settings indicating a use of printing, built-in controller 41 (screen determiner 41b) executes the next step (Step S106).

Built-in controller 41 (screen determiner 41b) then determines whether the job information includes settings for a finisher directed to production printers (settings for a finishing process) (Step S106). On determining that the job information includes settings for a finisher directed to production printers (settings for a finishing process) (YES in Step S106), built-in controller 41 (screen determiner 41b) determines that screens are to be displayed in the second display mode (the display mode for production printing) (Step S114). Built-in controller 41 (display controller 41c) then causes display and operation unit 47 to display screens in the second display mode (Step S115). On finding no information relating to a finisher directed to production printers, built-in controller 41 (screen determiner 41*b*) executes the next step (Step S107).

Built-in controller 41 (screen determiner 41*b*) then determines whether the job was received through external controller 30 (Step S107). On determining that the job was received through external controller 30 (YES in Step S107), built-in controller 41 (screen determiner 41*b*) determines whether image forming apparatus 40 is connected with external controller 30 in the page mode (the mode in which data communications are conducted one page by one page) or the job mode (the mode in which data communications are conducted one job by one job) (Step S108). In the case of the page mode, it is expected that the data communication in the page mode makes the load of image forming apparatus 40 small and image forming apparatus 40 can work with high performance, which is suitable for production printing. In view of that, on determining that the apparatuses are connected with each other in the page mode, built-in controller 41 (screen determiner 41*b*) determines that screens are to be displayed in the second display mode (the display mode for production printing) (Step S114). Built-in controller 41 (display controller 41*c*) then causes display and operation unit 47 to display screens in the second display mode (Step S115). On determining that the apparatuses are connected with each other in the job mode, or finding no information relating to the connection of image forming apparatus 40 and external controller 30, built-in controller 41 (screen determiner 41*b*) executes the next step (Step S109).

Built-in controller 41 (screen determiner 41*b*) then checks the job information to determine whether the number of pages to be printed is not less than the predetermined number of pages (Step S109). On determining that the number of pages to be printed is not less than the predetermined number of pages (YES in Step S109), built-in controller 41 (screen determiner 41*b*) determines that screens are to be displayed in the second display mode (the display mode for production printing) (Step S114). Built-in controller 41 (display controller 41*c*) then causes display and operation unit 47 to display screens in the second display mode (Step S115). On determining that the number of pages to be printed is less than the predetermined number of pages (No in Step S109), built-in controller 41 (screen determiner 41*b*) executes the next step (Step S110). The way to set the predetermined number of pages may be defined arbitrarily, and the predetermined number of pages may be set beforehand, or may be set by an operator. In view of the fact that 1000 or more pages are printed in production printing in most cases, the predetermined number of pages may be set to 1000 pages.

Built-in controller 41 (screen determiner 41*b*) then checks the job information to determine whether the number of copies to be printed is not less than the predetermined number of copies (Step S110). On determining that the number of copies to be printed is not less than the predetermined number of copies (YES in Step S110), built-in controller 41 (screen determiner 41*b*) determines that screens are to be displayed in the second display mode (the display mode for production printing) (Step S114). Built-in controller 41 (display controller 41*c*) then causes display and operation unit 47 to display screens in the second display mode (Step S115). On determining that the number of copies to be printed is less than the predetermined number of copies (No in Step S110), built-in controller 41 (screen determiner 41*b*) executes the next step (Step S111). The way to set the predetermined number of copies may be defined arbitrarily, and the predetermined number of copies may be set beforehand, or may be set by an operator. In view of the fact that 100 or more copies are printed in production printing in most cases, the predetermined number of copies may be set to 100 copies.

Built-in controller 41 (screen determiner 41*b*) then checks the job information to determine whether the type of printing medium (printing paper) is high-class paper, which is used in production printing in many cases (Step S111). On determining that the type of printing medium (printing paper) is high-class paper (YES in Step S111), built-in controller 41 (screen determiner 41*b*) determines that screens are to be displayed in the second display mode (the display mode for production printing) (Step S114). Built-in controller 41 (display controller 41*c*) then causes display and operation unit 47 to display screens in the second display mode (Step S115). On determining that the type of printing medium (printing paper) is not high-class paper or failing to determine that screens are to be displayed in the second display mode (No in Step S111), built-in controller 41 (screen determiner 41*b*) determines that screens are to be displayed in the first display mode (the display mode for office printing) (Step S112). Built-in controller 41 (display controller 41*c*) then causes display and operation unit 47 to display screens in the first display mode (Step S113).

In the steps of the flowchart in FIG. 5, built-in controller 41 (screen determiner 41*b*) determines the display mode of screens by using the type of printer driver 21*c*, settings for a use of printer driver 21, settings for a use of a finisher directed to production printers, the mode of connection with external controller 30, the number of pages to be printed, the number of copies to be printed, and the type of printing medium. However, the contents and the numbers of the items used for the determination and the order of the items used for the determination are not limited to those in the steps of the flowchart in FIG. 5 and may be changed arbitrarily.

Hereinafter, a description is given of screens in the first display mode (display mode for office printing) and screens in the second display mode (display mode for production printing) in details, with reference to examples of screens illustrated in FIGS. 6 to 12.

FIG. 6 is a schematic diagram illustrating an example of top menu screen 60 in the display mode for office printing. Top menu screen 60 in the display mode for office printing, shows a small number of tabs (in this case, four tabs of "Universal Settings", "Counter", "Function Search", and "Job List") so as to be easy for operators who are not experts in operations of image forming apparatus 40. Top menu screen 60 in the display mode for office printing, further shows big buttons each together with a text and an icon representing what the button does.

In response to an operator's selection of the "Job List" tab in top menu screen 60, built-in controller 41 (display controller 41*c*) causes display and operations unit 47 to display active job screen 61 (the list of current and waiting jobs) in the display mode for office printing as illustrated in FIG. 7. Active job screen 61 shows a small number of tabs (in this case, three tabs of "Active", "Log" and "Communication List") so as to be easy for operators who are not experts in operations of image forming apparatus 40. Active job screen 61 further shows the document name or the destination of each job (the "Doc. Name/Destination" column in the list) so as to allow operators who are not experts to understand the contents of each job easily. In many cases of print processing for office printing, the number of copies to be printed is not so large. Therefore, active job screen 61 in the display mode for office printing does not show the "Number of Copies" column in the list.

In response to an operator's selection of the "Log" tab in active job screen 61, built-in controller 41 (display controller 41c) causes display and operations unit 47 to display log screen 62 (the job history list) in the display mode for office printing, as illustrated in FIG. 8. Log screen 62 also shows the "Doc. Name/Destination" column in the list so as to allow operators who are not experts to understand the contents of each job easily. In many cases of print processing for office printing, the number of copies to be printed is not so large. Therefore, log screen 62 does not show the "Number of Copies" column in the list. In many cases, a large number of jobs that appear in the list disturbs a search by operators who are not experts for a desired job. Therefore, log screen 62 shows the job filter for filtering jobs to be displayed in the list on the basis of the selected conditions: "All Jobs", "Finished Jobs" and "Deleted Jobs", so as to allow an operator to select one of the conditions on the screen.

On the other hands, FIG. 9 is a schematic diagram illustrating an example of top menu screen 70 in the display mode for production printing. Top menu screen 70 in the display mode for production printing, shows various tabs (in this case, six tabs of "Machine Status", "Job List", "HDD Recall", "Save", "Copy" and "Scan") so as to allow operators who are experts in operations of image forming apparatus 40 to configure various kinds of settings on one screen. Top menu screen 70 in the display mode for production printing, further shows various tabs (in this case, six tabs of "Machine Status", "Job List", "HDD Recall", "Save", "Copy" and "Scan") so as to allow operators who are experts to configure various settings on one screen. Top menu screen 60 further shows the output status, the original document counter, the available memory, the number of reserved jobs, a list of reserved jobs and a list of paper trays, so that an operator can check the status of the apparatus on top menu screen 70. On comparison between top menu screen 70 and top menu screen 60 in FIG. 6, the screen for production printing shows a lot of information together so as to allow operators who are experts to perform various kinds of operations on one screen. Further, top menu screen 70 and top menu screen 60 are different in the layout, expressing manner and contents of the screen, and the difference of the display modes greatly affects the operator's impression of the screen.

In response to an operator's selection of the "Job List" tab in top menu screen 70, built-in controller 41 (display controller 41c) causes display and operations unit 47 to display job list screen 71 in the display mode for production printing, as illustrated in FIG. 10. Job list screen 71 shows various tabs (in this case, eight tabs of "Hold Job", "Secure Job", "Schedule", "Reserved Job", "Spool", "Output Log", "Communication Log" and "Incomplete Output") so as to allow operators who are experts to check the details of each job easily. In many cases of print processing for production printing, image forming apparatus 40 handles a number of jobs together, which makes an operator' recognition of jobs on the basis of the document names or destinations difficult. Therefore, job list screen 71 shows the file name of each job (the "File Name" column in the list). Since image forming apparatus 40 handles a number of jobs given by many operators together, in many cases of print processing for production printing, job list screen 71 shows the user name for each job (the "User Name" column in the list). Further, since an increased number of copies are specified to be printed in many cases of print processing for production printing, job list screen 71 shows the number of copies to be printed, for each job (the "Copies" column in the list).

In response to an operator's selection of the "Reserved Job" tab in job list screen 71, built-in controller 41 (display controller 41c) causes display and operation unit 47 to display reserved job screen 72 (the list of reserved jobs) in the display mode for production printing (which is equivalent or corresponding to active job screen 61 in the display mode for office printing) as illustrated in FIG. 11. Reserved job screen 72 also shows the file name of each job (the "File Name" column in the list), because in many cases of print processing for production printing, image forming apparatus 40 handles a number of jobs together, which makes an operator' recognition of jobs on the basis of the document names or destinations difficult. Reserved job screen 72 also shows the user name for each job (the "User Name" column in the list), because image forming apparatus 40 handles a number of jobs given by many operators together, in many cases of print processing for production printing. Reserved job screen 72 also shows the number of copies to be printed and the number of remaining copies to be printed, for each job (the "Copies" column and the "Remaining Copies" column in the list), because an increased number of copies are specified to be printed in many cases of print processing for production printing.

In response to an operator's selection of the "Output Log" tab in reserved job screen 72, built-in controller 41 (display controller 41c) causes display and operation unit 47 to display output log screen 73 (the list of output jobs) in the display mode for production printing as illustrated in FIG. 12. Output log screen 73 also shows the file name of each job (the "File Name" column in the list), because in many cases of print processing for production printing, image forming apparatus 40 handles a number of jobs together, which makes an operator' recognition of jobs on the basis of the document names or destinations difficult. Output log screen 73 also shows the user name for each job (the "User Name" column in the list), because image forming apparatus 40 handles a number of jobs given by many operators together, in many cases of print processing for production printing Output log screen 73 also shows the number of copies to be printed for each job (the "Copies" column in the list), because an increased number of copies are specified to be printed in many cases of print processing for production printing. Accordingly, each of the screens for production printing shows a large amount of information together so as to allow operators who are experts to check the details of each job. Further, the screens for production printing, are different in the layout, expressing manner and contents of the screen, from the screens for office printing, and the difference of the display mode greatly affects the operator's impression of the screens. For example, screens for production printing show a number of tabs, and it is necessary for an operator to select a tab accessible to a screen containing desired information, from a number of tabs, which is convenient for an operator who is an expert to access a desired screen but is difficult to understand for an operator who is not an expert to use. Further, each screen for production printing allows an operator to access various functions relating to printing, which is difficult to understand for an operator who is not an expert to use. It may easily result in erroneous operations and confusion of the operator who is not an expert.

In view of that, built-in controller 41 of image forming apparatus 40 is configured to perform the following operations. Built-in controller 41 uses information contained in a received job, to determine which of the first display mode (the display mode for office printing) and the second display mode (the display mode for production printing), is to be used for displaying screens, and causes display and operation unit 47 to display one or more screens showing information about the received job in the determined one of the first display mode and the second display mode. With the operations, image forming apparatus 40 can present, to each operator, screens in the display mode suitable to the operator's use of the functions of the image forming apparatus 40, without operator's operations to switch the display mode. With the operations, erroneous operations and confusion of operators can be avoided, which realizes operators' quick and appropriate operations on the screens.

It should be noted that the present invention should not be limited to the above-described embodiments, and the constitution and control operations of the image forming apparatus and the system including the image forming apparatus can be modified appropriately, unless the modification deviates from the intention of the present disclosure.

For example, the above-described embodiment gave display control operations to switch between the display mode for office printing and the display mode for production printing. However, the display control operations (the display control method) may be applied to an arbitrary apparatus configured to display screens each relating to certain function of the apparatus in different display modes selectively according to the operator's use of the function of the apparatus.

The present disclosure is applicable to image forming apparatuses each equipped with functions of both an office printer and a production printer, display control programs for controlling operations to display screens on the image forming apparatus, non-transitory computer-readable recording media each storing the display control program, and display control methods.

Although embodiments of the present disclosure have been described and illustrated in detail, it is clearly understood that the same is by way of illustration and example only and not limitation, the scope of the present invention should be interpreted by terms of the appended claims As used throughout this application, the words "can" and "may" are used in a permissive sense (i.e., meaning having the potential to), rather than the mandatory sense (i.e., meaning must). The words "include", "including", and "includes" and the like mean including, but not limited to. As used herein, the singular form of "a", "an", and "the" include plural references unless the context clearly dictates otherwise. As employed herein, the term "number" shall mean one or an integer greater than one (i.e., a plurality).

Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

The invention claimed is:

1. An image forming apparatus, comprising:
   a printer engine configured to form images on printing media;
   a display configured to display one or more screens each relating to operation of the image forming apparatus; and
   a hardware processor that performs operations, including:
   in response to receiving a job which gives print instructions to the printer engine, analyzing the job;
   in response to the analysis, determining which one of a first display mode and of a second display mode, the second display mode being different from the first display mode, is to be used for displaying the one or more screens, on a basis of information contained in the job, the contained information being descriptive of at least one of the job and one or more origination attributes of the job; and
   in response to the determination, automatically causing the display to display the one or more screens showing information about the job, in the determined one mode,
   wherein the first and second display modes cause at least one same function to be given first and second levels of importance, respectively, such that more information is displayed, for the at least one same function, in the first display mode than in the second display mode.

2. The image forming apparatus of claim 1, wherein the description includes at least one of a number of pages to be printed and a number of copies to be printed.

3. The image forming apparatus of claim 1, wherein the description includes a type of printing media.

4. The image forming apparatus of claim 1, wherein the description includes at least one of a type of a printer driver that submitted the job to the image forming apparatus and settings for the printer driver.

5. The image forming apparatus of claim 1, wherein the description includes settings for a finishing process.

6. The image forming apparatus of claim 1, wherein the description includes, on judging that the job was received through an external controller communicably connected with the image forming apparatus, settings for the external controller.

7. The image forming apparatus of claim 1, wherein each screen in the second display mode shows a greater number of items than items shown in a corresponding screen in the first display mode.

8. The image forming apparatus of claim 1, wherein each screen in the second display mode shows at least an item about weight of printing media, and each screen in the first display mode shows one or more items about other than weight of printing media.

9. The image forming apparatus of claim 1, wherein the first display mode is a display mode for office printing, and the second display mode is a display mode for production printing.

10. A non-transitory computer-readable recording medium storing a display control program to be executed in an apparatus including a hardware processor configured to control a printer engine that forms images on printing media, and a display configured to display one or more screens each relating to operation of the apparatus or the printer engine, the program comprising instructions which, when executed by the hardware processor of the apparatus, cause the hardware processor to perform operations comprising:
   in response to receiving a job which gives print instructions to the printer engine, analyzing the job;
   in response to the analysis, determining which one of a first display mode and of a second display mode, the second display mode being different from the first display mode, is to be used for displaying the one or more screens, on a basis of information contained in the job, the contained information being descriptive of at least one of the job and one or more origination attributes of the job; and in response to the determination, automatically causing the display to display the one or more screens showing information about the job, in the determined one mode, wherein the first and second display modes cause at least one same function to be given first and second levels of importance, respectively, such that more information is displayed, for the at least one same function, in the first display mode than in the second display mode.

11. The non-transitory computer-readable recording medium of claim 10, wherein the description includes at least one of a number of pages to be printed and a number of copies to be printed.

12. The non-transitory computer-readable recording medium of claim 10, wherein the description includes a type of printing media.

13. The non-transitory computer-readable recording medium of claim 10, wherein the description includes at least one of a type of a printer driver that submitted the job to the apparatus and settings for the printer driver.

14. The non-transitory computer-readable recording medium of claim 10, wherein the description includes settings for a finishing process.

15. The non-transitory computer-readable recording medium of claim 10, wherein the description includes, on judging that the job was received through an external controller communicably connected with the apparatus, settings for the external controller.

16. The non-transitory computer-readable recording medium of claim 10, wherein each screen in the second display mode shows a greater number of items than items shown in a corresponding screen in the first display mode.

17. The non-transitory computer-readable recording medium of claim 10, wherein each screen in the second display mode shows at least an item about weight of printing media, and each screen in the first display mode shows one or more items about other than weight of printing media.

18. The non-transitory computer-readable recording medium of claim 10, wherein the first display mode is a display mode for office printing, and the second display mode is a display mode for production printing.

19. A display control method for use in a printing system including a printer engine that forms images on printing media, and an apparatus including a hardware processor configured to control the printer engine and a display configured to display one or more screens each relating to operation of the apparatus or the printer engine, the method comprising:

in response to receiving a job which gives print instructions to the printer engine, analyzing the job, by the hardware processor;

in response to the analysis, determining which one of a first display mode and of a second display mode, the second display mode being different from the first display mode, is to be used for displaying the one or more screens, on a basis of information contained in the job, by the hardware processor, the contained information being descriptive of at least one of the job and one or more origination attributes of the job; and in response to the determination, automatically causing, by the hardware processor, the display to display the one or more screens showing information about the job, in the determined one mode, wherein the first and second display modes cause at least one same function to be given first and second levels of importance, respectively, such that more information is displayed, for the at least one same function, in the first display mode than in the second display mode.

* * * * *